(12) United States Patent
Daubertais (10) Patent No.: US 11,779,024 B2
(45) Date of Patent: Oct. 10, 2023

(54) DEVICE FOR SPREADING RUNNY BATTER ON A HOT PLATE

(71) Applicant: CONCEPT-MAINTENANCE, Binic (FR)

(72) Inventor: Frédéric Daubertais, Binic (FR)

(73) Assignee: CONCEPT-MAINTENANCE, Binic (FR)

( * ) Notice: Subject to any disclaimer, the term of this patent is extended or adjusted under 35 U.S.C. 154(b) by 796 days.

(21) Appl. No.: 16/628,445

(22) PCT Filed: Jul. 4, 2018

(86) PCT No.: PCT/EP2018/068143
§ 371 (c)(1),
(2) Date: Jan. 3, 2020

(87) PCT Pub. No.: WO2019/008065
PCT Pub. Date: Jan. 10, 2019

(65) Prior Publication Data
US 2020/0383338 A1  Dec. 10, 2020

(30) Foreign Application Priority Data

Jul. 7, 2017  (FR) ...................................... 1770726
Nov. 29, 2017  (FR) ...................................... 1771276

(51) Int. Cl.
*A21B 5/03* (2006.01)
*A21C 5/00* (2006.01)
(Continued)

(52) U.S. Cl.
CPC ................ *A21C 5/006* (2013.01); *A21B 5/03* (2013.01); *A21C 11/004* (2013.01); *A47J 44/02* (2013.01)

(58) Field of Classification Search
CPC ... A21C 5/006; A21B 5/03; A21D 8/02; A47J 44/00; A47J 44/02
See application file for complete search history.

(56) References Cited

U.S. PATENT DOCUMENTS

2011/0189364 A1 * 8/2011 Mulugeta ............... A21C 5/006
426/505

FOREIGN PATENT DOCUMENTS

EP  3146844 A1  3/2017
FR  27009231  *  2/1993  ............. A21C 5/006
(Continued)

OTHER PUBLICATIONS

Sep. 21, 2018 International Search Report issued in International Patent Application No. PCT/EP2018/068143.
(Continued)

*Primary Examiner* — Reginald Alexander
(74) *Attorney, Agent, or Firm* — Oliff PLC; R. Brian Drozd (57) ABSTRACT

A device for spreading a runny batter on a hotplate for manufacturing pancakes or crêpes, including a rotary shaft intended to be disposed almost perpendicular with respect to the cooking face of the hotplate, a plate fixed to said rotary shaft, said plate carrying a spreading and raking means, and at least one abutment designed to bear, run or slide on the heating face of the hotplate. The spreading and raking includes at least one rake, the working free edge of which is rectilinear, making it possible to spread a portion of batter previously deposited on the heating face of said hotplate and rake the thickness of batter as long as it remains liquid so as to redeposit a layer of material upstream in order to layer the batter and fill in the holes, reproducing the action of a person skilled in the art of making pancakes or crêpes.

12 Claims, 4 Drawing Sheets

(51) Int. Cl.
*A21C 11/00* (2006.01)
*A47J 44/02* (2006.01)

(56) References Cited

FOREIGN PATENT DOCUMENTS

FR 2688657 A1 9/1993
JP 2012-254033 A 12/2012

OTHER PUBLICATIONS

Sep. 21, 2018 Written Opinion issued in International Patent Application No. PCT/EP2018/068143.

* cited by examiner

DEVICE FOR SPREADING RUNNY BATTER ON A HOT PLATE

The present invention relates to a device for spreading runny batter on a hotplate in order to make pancakes or crêpes.

Making pancakes by spreading batter on a heated metal plate has been known since at least the thirteenth century.

At the present time, a popular utensil for spreading the batter is known. This utensil, called a "rozell", is a kind of rake provided with a handle and which the user rotates on the batter in order to spread and surface it on the hotplate. This action requires practice in order to carry it out successfully. During the mechanical action of the utensil, the user defines the thickness of the pancake or cêrpe and the diameter thereof. The raking work of the utensil also forms a stack of layers of the batter.

Cooking surfaced by hand allows high-temperature cooking and stacking of the layers of batter at different cooking moments, during the very short spreading cycle, which does not last more than three seconds in general. This type of cooking releases the flavours of the ingredients making up the batter. Pressing the batter on the cooking zone has the effect of reducing the cooking time, by improving the transfer of heat. The choice of the correct searing temperature, and the fact of staging the cooking, are variables that constitute the correct action of the person skilled in the art of making pancakes. The result is quality work.

Furthermore, this method of spreading involves direct proximity of the hand and forearm above the batter, which may, in the manufacture of the products, give rise to a lack of hygiene, the requirement for which is very high in the field of the food industry.

However, the pancake and cêrpe market, of the "handmade" type, is growing rapidly since the taste and texture are meeting the demands of consumers.

Therefore, at the present time, work by hand is the best guarantee of having optimum gustatory quality.

Furthermore, work by hand gives rise to other drawbacks: this action is very constraining in terms of MSDs (musculoskeletal disorders) and requires high precision. The level of wastage resulting from this repeated work by hand is significant because of this difficulty and staff are more and more difficult to find or keep.

These findings have encouraged the inventors to design machines for overcoming these drawbacks. Thus a pancake-making machine, published in the application FR-A-2 204 946, is known. The machine is composed of a frame supporting a horizontal hotplate and provided with horizontal rails extending on either side of said hotplate and on which a carriage can run by moving it manually by means of a handle. The carriage carries a hopper intended to contain pancake batter. The hopper has, at its bottom part, two lips determining a slot for dispensing said batter. The hopper comprises a control lever for opening and closing the dispensing slot. The carriage carries a batter reservoir provided with a constant-level device for filling the hopper. The machine procures uniform cooking of pancakes without having to turn them over. However, the machine is not capable of reproducing the knack of a human pancake maker.

This machine is satisfactory only in relation to batters with a consistency that is well determined in the raw state, and can be associated only with well determined types of automatic cooking machines.

The problems posed with this type of apportioner/spreader are as follows:

The edges of the cêrpe thus formed remain substantially at the same thickness as the centre. Because of this, there is a high probability that there is a difference in cooking between the outer edge and the centre because the cooking zone is cooled unevenly by the raw cold batter deposited at the centre of the hotplate. Consequently, either the edges are crumbly and therefore this poses problems with gripping, folding, conveying, packaging and also storage, or the cooking at the centre is not sufficient and mould may appear a few days after packaging.

The required consistency of the batter in order to obtain a suitable cêrpe or pancake requires a particularly precise batter texture.

Another known problem, gluten-free batters (100% buckwheat by way of non-limitative example) pose problems with spreading. This principle extends the batter but does not surface it (manufacturers have to act on the addition of gluten and/or lower the temperatures, so that they can produce their product with this spreader.

Thus the uniform appearance of the crêpes or pancakes thus formed gives an "industrial" visual appearance, which does not attract consumers seeking authenticity.

This machine requires a perfectly flat hob surface. Because of this, for example, old hotplate carousels are worn unevenly by daily raking and clogging. These are not compatible with this apportioner/spreader when purchased second hand. And when they are new this normal wear, which occurs quickly, impairs the precision of the apportioning/spreading. This apportioner/spreader requires the plates to remain perfectly flat, which is utopian since persons skilled in the art scrape them frequently.

The patent FR-A-2 700 923 proposes a device for spreading batter on a hotplate after apportioning, in order to make crêpes, pancakes, blinis, pannequets, brick pastry, or derivatives. The spreader device comprises a flat curve-shaped spreader, in the form of an S, made from Teflon®, and which is driven in a rotation movement by means of an electric speed-change drive unit and is arranged so as to distribute the batter from the centre towards the outside on the hotplate. The batter is conveyed along the rotation axis of the device in order to be deposited at the centre of the plate.

Three shoe-type damping cylinders provide a gentle descent of the spreader device as well as the precision of the position of the spreader with respect to the plate. The apportioning is designed using a volumetric pump, with controlled valves, of the solenoid valve type.

The spreader device is mounted in moving equipment designed so as to cyclically follow the circular movement of each of the plates constituting a carousel. The movement of the moving equipment is implemented by means of guide rails and a cylinder. It is carried out externally to the carousel.

One drawback of this spreader device is the soiling of the Teflon®, which is difficult to control, and the complex system for working from the outside. It is also necessary to consider the relatively great expansion of the Teflon® rake, which is a problem in obtaining precise adjustment thereof and limits the duration of this adjustment. This device merely spreads the batter on the hotplate.

The patent FR-A1-2 665 381 presents a device for spreading batter on a cooking face. It has a rotary pipe diffusing pressurised air on a portion of batter previously deposited on the cooking face.

This device merely spreads the portion of batter on the cooking face through the use of compressed air.

Thus, knowing this prior art, the applicant sought to design a device for spreading batter on a hotplate that can procure working of the batter that is comparable with the use of a rozell by a professional in order to meet the expectations of customers but which can also be used industrially, that is to say for high production volumes while keeping a constant manufacturing quality.

To this end, a device is proposed for spreading runny batter on a hotplate in order to manufacture pancakes or crêpes, comprising a rotary shaft intended to be disposed almost perpendicular with respect to the cooking face of the hotplate, a plate fixed to said rotary shaft, said plate carrying a spreading and raking means, at least one abutment designed to bear and run or slide on the cooking face of the hotplate; according to the invention, the spreading and raking means comprises at least one rake, the working free edge of which is rectilinear, making it possible firstly to spread a portion of batter previously deposited on the heating face of said hotplate and secondly to rake the thickness of batter as long as it remains liquid so as to redeposit a layer of material upstream in order to layer the batter and fill in holes, reproducing the action of a person skilled in the art of making pancakes or crêpes.

The rake may be disposed at a very precise height with respect to the heating surface of the hotplate in order to spread the portion of batter and to work the batter during the start of cooking thereof.

According to an additional feature of the invention, the device for spreading runny batter comprises a first rake carried by said plate and a second rake carried on a second plate, the free edge of the first rake being disposed so as to be practically secant to the axis of the rotary shaft, the inner edge of the first rake extending at least as far as the axis of said shaft, the second plate being connected to the first plate by means of height-adjustment means, considering the device in the position of use thereof.

The first rake makes it possible to spread the portion of batter on the hotplate whereas the second rake serves to spread the batter and also to delimit the diameter of the pancake. However, the essential function of this second rake is to manufacture the pancake during cooking thereof by exerting pressure on the batter in order to toast the film of batter in contact with the hotplate and raking the thickness of batter as long as it remains liquid so as to redeposit a layer of material upstream in order to layer the batter and fill in holes, just like the action of a person skilled in the art of making pancakes. The adjustment for height of this second plate makes it possible to adapt the device of the invention to each of the pancake or crêpe recipes.

Advantageously, the adjustment means comprise bolts connecting the two plates and springs interposed between the two plates so as to procure a floating assembly of the second plate.

This floating assembly of the second rake avoids the formation of waves in the structure of the pancake or of the crêpe, by exerting a substantially constant pressure thereon.

According to an additional feature of the invention, said or each rake is disposed so as to be inclined with respect to a plane tangent perpendicularly to said abutment and the angle of which is between 20 degrees and 30 degrees.

The amount of this inclination procures satisfactory results with regard to the raking of the batter in order to produce layering thereof during cooking thereof.

According to an additional feature of the invention, the second rake is mounted on a support assembled on the second plate, by means of a fixing means with its axis parallel to that of the rotary shaft, allowing an angular adjustment of said support with respect to this second plate.

This option of being able to orient the second rake makes it possible to precisely distribute the spreading of the batter between the centre and the periphery according to the recipe of the batter, by acting on the speed of ejection of the batter towards the periphery.

According to an additional feature of the invention, said or each rake consists of a sheet of silicone or consists of a plurality of sheets of silicone superimposed.

This material has been chosen for its harmlessness with regard to food, its good temperature resistance, its flexibility and its good resistance to soiling.

According to an additional feature of the invention, a weight is fixed to the support of the second rake so that its free edge can exert a predefined working pressure on the batter being cooked during the manufacture of the pancake or cêrpe.

The mass of the weight has an influence on the thickness of the pancake or cêrpe, and on the speed of cooking thereof.

According to an additional feature of the invention, the second rake is provided on its outer lateral edge with a retainer intended to delimit the maximum spreading perimeter of the batter, in this way defining the diameter of the pancake.

The diameter of the pancake or crepe is defined precisely.

According to an additional feature of the invention, the device for spreading a runny batter comprises three abutments respectively consisting of three ball bearings, and the axes of which are secant to the axis of the shaft.

The device can thus run perfectly on the periphery of the hotplate.

According to an additional feature of the invention, the shaft is connected to a rotation means.

The rake or rakes are rotated so as to spread the portion of batter and to work the batter on the hotplate.

There also forms part of the invention an assembly comprising a carousel provided with:
  a rotary table mounted for rotation about a vertical axis, considering the operating position of said carousel, the table carrying a plurality of hotplates distributed at the periphery thereof,
  a pivoting arm the rotation axis of which is coaxial with that of the rotary table, the pivoting arm comprising a first part carrying the articulation shaft of said arm, and a second part able to move vertically with respect to the first part by means of a linear guide means and counter to a linear manoeuvring means. The distal end of the second part of the pivoting arm carries a device for spreading a runny batter that is described above.

The carousel makes it possible to manufacture pancakes or crêpes continuously.

According to an additional feature of the invention, the rotary table is provided with a ring centred on its rotation axis, said ring being pierced at its periphery with a plurality of holes with a vertical axis, which are distributed angularly, the second part being provided with a tapered pin which, during the descent movement of this second part, fits and positions itself in a corresponding hole, the pivoting arm being connected to a manoeuvring means designed to pivot it angularly about its rotation axis.

The pivoting arm moves the spreading device sequentially over each hotplate. The spreading device remains perfectly located on the rotary table, during its work on a corresponding hotplate.

The features of the invention mentioned above, as well as others, will emerge more clearly from a reading of the following description of an example embodiment, said description being given in relation to the accompanying drawings, among which.

Figure 1:
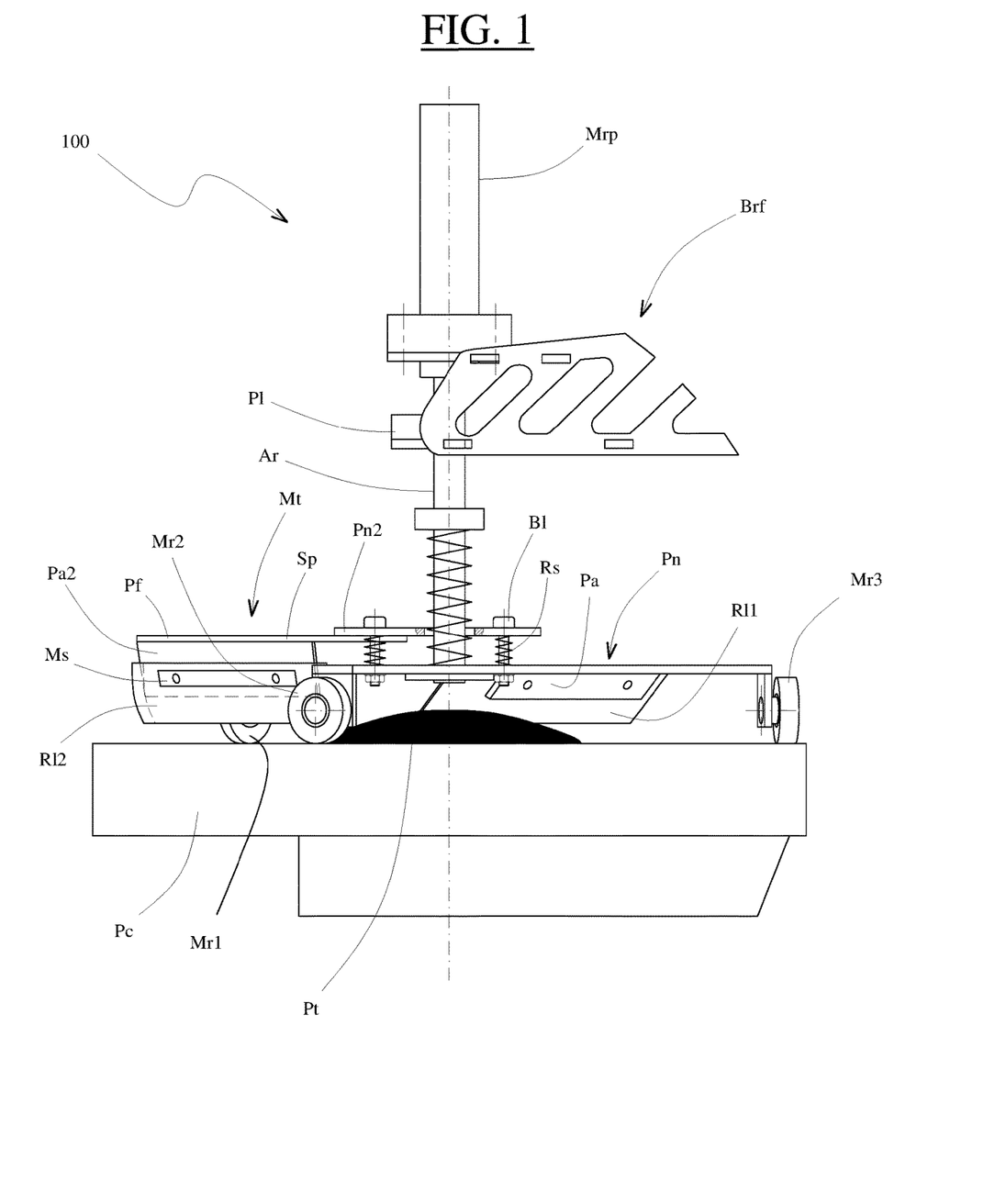
FIG. 1 shows a lateral view of a device for spreading batter on a hotplate according to the invention.
Figure 2:
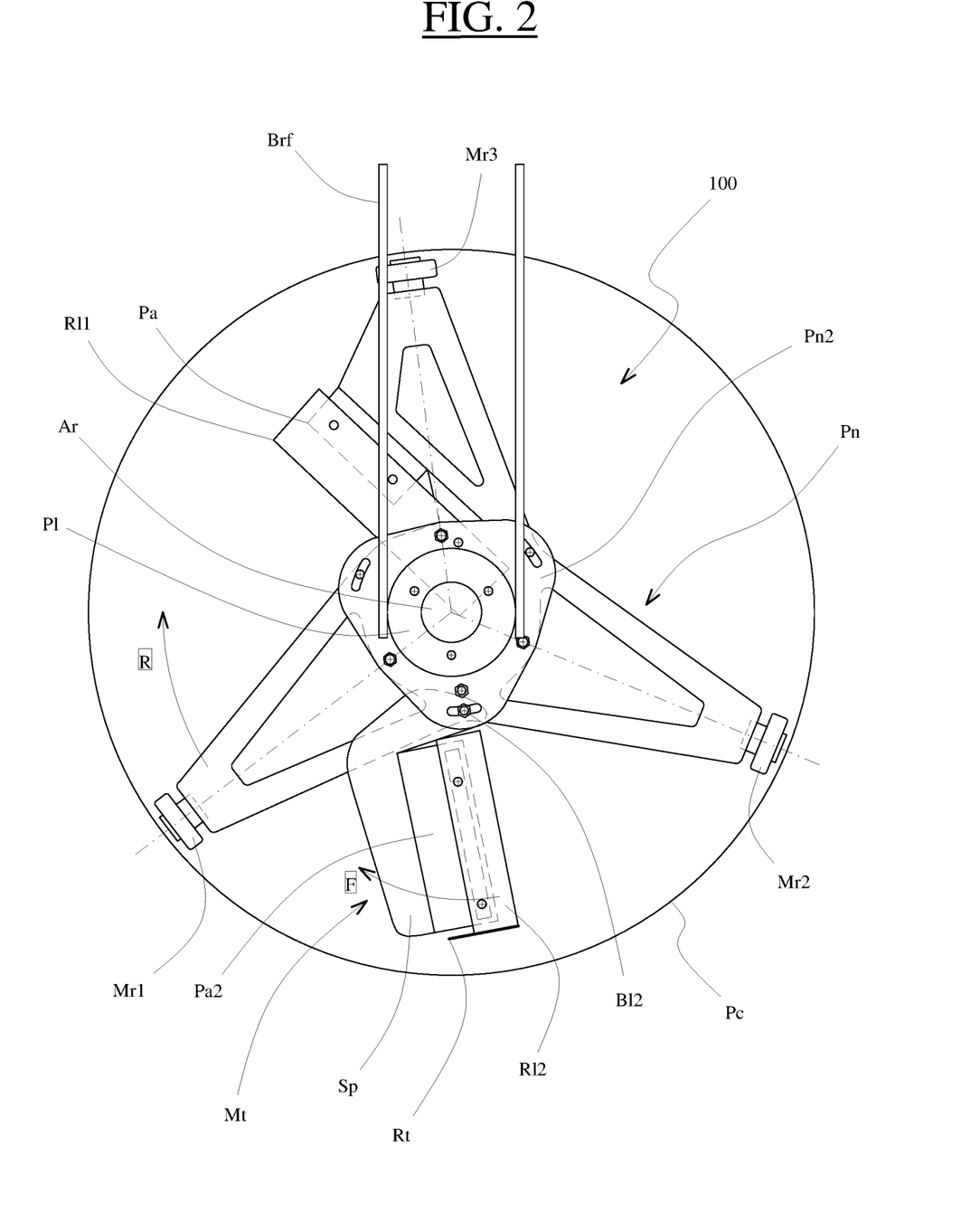
FIG. 2 shows a plan view of a device for spreading batter on a hotplate according to the invention.

The device 100 presented in FIGS. 1 and 2 is intended to spread batter on a hotplate, for manufacturing in particular pancakes, crêpes or blinis. For reasons of simplification of writing, all these round flat cakes are referred to as pancakes in the remainder of this description.

It can function autonomously with a plate or be slaved to the functioning of a carousel intended for manufacturing pancakes continuously. Such a carousel comprises a plurality of hotplates that are installed on a rotary table in order to produce pancakes continuously or a carousel consisting of a disc manufactured from cast iron and usually heated by flame. The various steps of the manufacturing of a pancake are carried out at various stations that the carousel has. These steps are in particular: the depositing of a portion of batter, the spreading thereof, the cooking thereof, the removal of the pancake and the cleaning/greasing of the hotplate.

The spreading system is separate from the apportioning system, which is preferentially volumetric apportioning with gravity deposition. The apportioning system may also include a piston pump. Dissociating the apportioning from the spreading system makes the stability of the pancake more reliable in terms of weight and cooking level.

The device 100 comprises a rotation shaft Ar that carries at one end a plate Pn carrying at least one abutment suitable for bearing and rolling or sliding on a hotplate Pc. Said or each abutment is preferentially formed by a ball bearing. It may however consist of a shoe.

The hotplate Pc is conventionally a metal plate heated by an electric element or by a flame. It has a flat working face, preferentially circular, which is arranged horizontally when the hotplate is in service.

The rotation shaft Ar is positioned vertically above the hotplate Pc, by means of a bearing P1 designed to allow a rotation movement and a translation movement of said shaft Ar therein. The axis of the shaft Ar is thus arranged practically perpendicular to the cooking face of the hotplate.

The bearing P1 is held either in a fixed arm Brf in the case of the use of the device 100 conjointly with a single hotplate of the bilig type as shown in these FIGS. 1 and 2, or a pivoting arm when the device 100 is used with a carousel and which is explained in detail below with reference to FIGS. 3 and 4.

The shaft Ar is connected to a rotation means that is preferentially a pneumatic rotary motor Mrp, which is shown in FIG. 1.

The translation movement of the shaft Ar is implemented by means of a manoeuvring means that is preferentially a single-acting pneumatic cylinder, not shown. The cylinder is mounted so that, when it is supplied, it raises the device 100 whereas, when its chamber is connected to the exhaust, the device descends by gravity. The single-acting cylinder may however be replaced by a double-acting cylinder, the descent movement of which is regulated by means of a speed limiter.

The plate Pn is formed by a preferably flat platen mounted perpendicular to the axis of the shaft Ar. The plate Pn forms in plan view a three-armed star. The perimeter thereof is thus delimited by three vertices on which respectively three running means Mr1, Mr2 and Mr3 are fixed. The axes of these running means Mr are secant to the axis of the shaft Ar. Thus the plate Pn is able to turn on the hotplate while remaining positioned at a constant distance therefrom. Referencing the plate Pn on three isostatic points on the hotplate compensates at least partly for the degree of wear thereof.

The device 100 is equipped with a spreading and raking means Mt designed to work during rotation thereof on the hotplate Pc. It is intended firstly to spread a portion of batter Pt on the hotplate in operation and previously deposited thereon and secondly to work the batter while it is being spread so as to form and stage layers on the hotplate so as to manufacture a layered batter, by stirring the batter and incorporating air therein.

The spreading and raking means Mt comprises at least one rake R1 that is fixed to the plate Pn.

However, and preferably, the spreading and raking means Mt comprises two rakes R11 and R12.

The first rake R11 serves mainly to spread a portion of batter Pt on the hotplate Pc. It is fixed directly to the plate Pn.

The second rake R12 also serves to spread the batter and to delimit the diameter of the pancake, but is used mainly to manufacture the pancake during cooking thereof by exerting pressure on the batter in order to sear the film of batter in contact with the hotplate Pc and by raking the thickness of batter as long as it remains liquid so as to redeposit a layer of material upstream so as to layer the batter and fill in holes, just like the action of a person skilled in the art of making pancakes.

The use of a single rake R11 as a spreading and raking means Mt is suitable for manufacturing pancakes from batter with a single composition and consistency.

The first rake R11 consists of at least one sheet manufactured from silicone, which is fixed to a lug Pa extending an arm of the plate Pn downwards and in an inclined fashion. The lug Pa is planar and the first rake R11 is fixed thereto while being applied flat. The working free edge of the rake R11 is rectilinear in order to spread the portion of batter and to work the batter.

Preferably, a plurality of superimposed sheets of silicone constitute the first rake R11 when the batter is relatively thick.

This first rake R11 is fixed for example by means of a pair of bolts to said lug. The rake R11 thus extends so as to be inclined and downwards in the direction of the cooking surface of the plate Pc. The inclined lug is disposed so that the straight line secant to the free edge of the rake R11 can be disposed so as to be practically secant to the axis of the shaft Ar, as shown in FIG. 2. The inner edge of the rake R11 extends at least as far as the axis of the shaft Ar and preferably a little beyond said axis in order to avoid the formation of excess thickness at the centre of the pancake during manufacture thereof.

The flexible material constituting the rake R11 enables the latter to adapt to the disparity of the geometries of the plates, in particular related to wear thereof.

The second rake R12 is mounted so that the position thereof can be adjusted with respect to the shaft Ar and more precisely with respect to the plate Pn. This adjustment makes it possible to adapt the manufacture of the pancakes according to the recipe of the batter and according to the requirements of the customers. Once the adjustment has been made, the functioning of the device 100 remains constant, making it possible to manufacture the same quality of pancake continuously.

The structure of this second rake R12 is similar to the first rake R11.

In FIG. 1, the second rake R12 is thus mounted on a support Sp secured to a second plate Pn2, which is disposed above the first plate Pn. The second plate Pn2 is connected to the first plate Pn, by means for adjusting for height such as bolts B1 connecting the two plates and springs Rs interposed between the two plates and which are preferentially mounted on the shanks of the bolts B1. It is possible in this way to lower or raise the level of the second plate Pn2 with respect to the first plate and to achieve an inclination of this second plate Pn2 with respect to the first. This floating mounting of the second rake R12 avoids the formation of waves in the structure of the pancake by exerting thereon a substantially constant raking pressure.

The support Sp is formed by a fixing plate Pf provided with a flat lug Pa2 that extends it downwards and in an inclined manner and to which the second rake R12 is fixed, for example by means of a pair of bolts. The fixing plate Pf is fixed to the second plate Pn2 by a fixing means allowing angular adjustment of said support Sp with respect to this second plate Pn2. The arrow F indicates, in FIG. 2, the possible orientation of the support Sp.

In FIG. 2, this fixing means consists of a bolt B12, the axis of which is parallel to that of the rotary shaft Ar. It is thus possible to orient the second rake R12. This possibility makes it possible to distribute the spreading of the batter precisely between the centre and the periphery according to the batter recipe. This adjustment makes it possible to control the rate of ejection of the batter towards the outside of the rake in correlation with the rotation speed of the rakes and the pressure that they exert on the batter.

The angle of inclination of each of the two lugs Pa and Pa2 and the axis of the rotation shaft Ar is between 20 degrees and 30 degrees with a preferential value of 25 degrees. This inclination procures an advantageous efficacy between the spreading of the portion of batter P2 and the raking of the surface of the batter during cooking.

In FIG. 1, the presence is noted of a weight Ms fixed to the support Sp and preferentially to the back of the second rake R12 by means of the two bolts in order to weigh down said rake so that the free edge thereof can exert a predefined working pressure on the batter being cooked during manufacture of the pancake. The choice of the weight makes it possible to define the thickness of the pancake according to the batter recipe. It also acts on the speed of cooking since the second rake R12 is able to exert a greater or lesser pressure on the batter being spread.

In FIG. 2, the second rake R12 is provided, on its outer lateral edge, with a retainer Rt intended to delimit the maximum spreading perimeter of the batter, in this way defining the diameter of the pancake.

According to the adjustment of the second rake R12, the flow of batter at the periphery of the pancake being cooked may create an excess thickness of material, which sometimes proves necessary for obtaining a perfectly even cooking of the batter. This is because the deposit of the portion of batter at the centre of the hotplate cools it locally for a short instant. This excess layering at the periphery of the pancake also facilitates gripping thereof and better consistency of the pancake, which is sometimes a requirement of the consumer.

The functioning of the device is described in a version equipped with two rakes.

The arm Brf of the device 100 is fixed in the vicinity of the hotplate Pc so that its shaft Ar can be disposed perpendicular to said hotplate and coaxially therewith. The hotplate is heated, and then a portion of batter Pt is deposited on the centre of the plate.

The device 100 is started up, the pneumatic motor rotates the shaft Ar and in its turn drives the plate Pn as suggested by the arrow R in FIG. 2 and the purged pneumatic cylinder causes the descent of the plate Pn and the three wheels Mr come into abutment and run on the perimeter of the heated face of the hotplate.

The first rake R11 spreads the portion of batter, expanding its surface in contact with the hotplate. The problem of the hole that may form at the centre of the batter during spreading is adjusted by a horizontal floating mounting of the shaft Ar of the device 100 at the start of the spreading step, and then with a centred axis thereafter. It is possible to use, in order to implement this centring technique, a tapered pin fitting in a corresponding hole. Another means for achieving this result consists of using a punctiform air jet conveyed by a pipette onto the centre of the hotplate Pc.

The second rake R12, adjusted correctly, in its turn works to expand the spreading of the batter until it reaches the retainer Rt.

During their rotation, the two rakes work so as to stage the layers of batter on the hotplate in order to manufacture a layered batter during the short period during which the batter remains liquid. Air is incorporated in the batter. The material is intimately mixed. The number of revolutions of the rakes is typically three or four turns, which corresponds to three successive passes of the rakes. The duration of these three or four cycles is approximately three seconds. The device 100 for spreading a runny batter on a hotplate procures cooking of the pancakes that most closely approaches the work of a person skilled in the art of manufacturing pancakes.

The work of the rakes spreads and presses the batter on the cooking surface. The constituents of the batter are intimately bound. The work of the rakes makes it possible to roast the sugar in the case of a cêrpe batter recipe or the buckwheat constituting a pancake batter recipe. It releases the flavours. It gives the pancake thus manufactured a softness, taste and texture entirely comparable with a handmade pancake.

Figure 3:
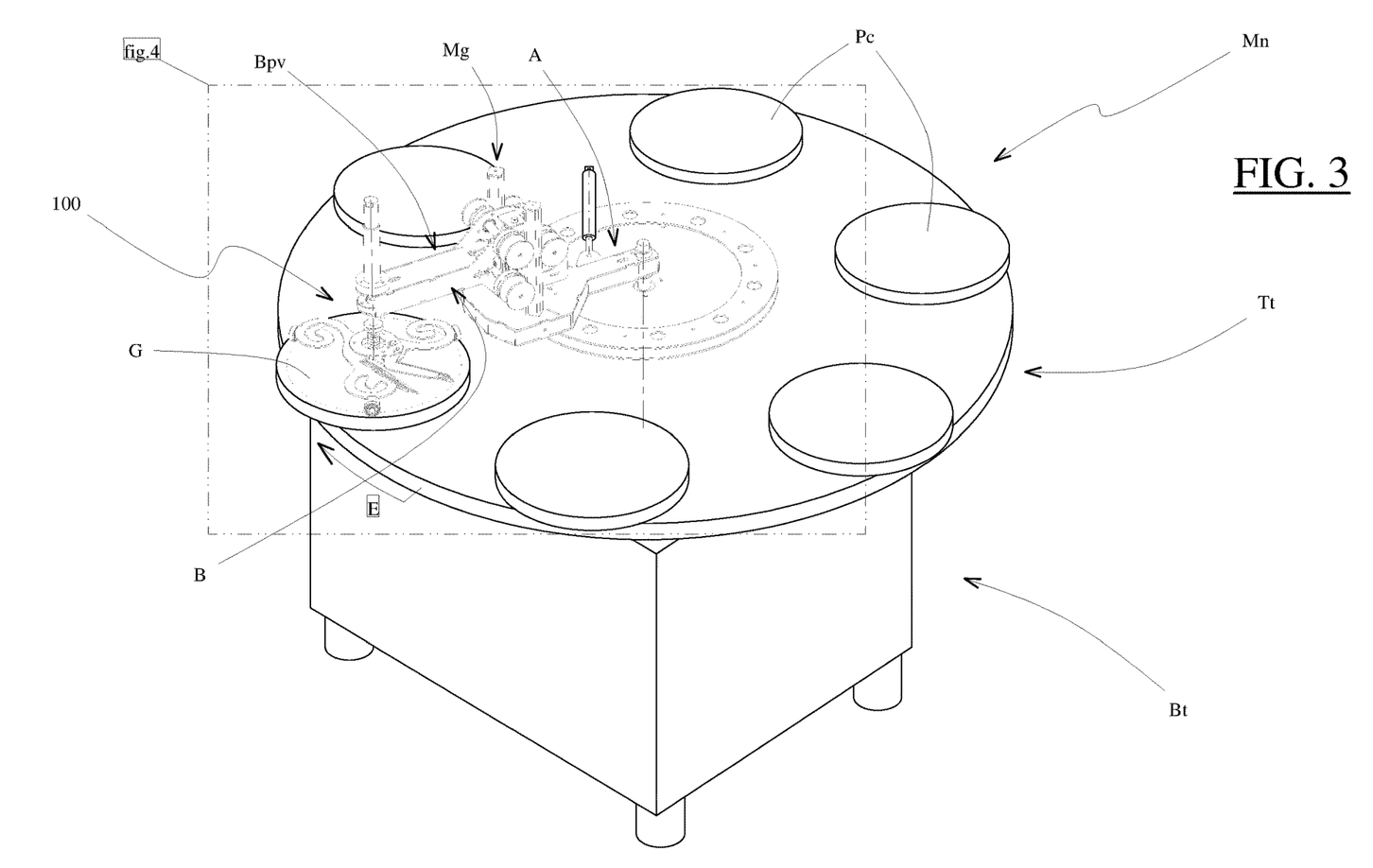
FIG. 3 shows a perspective view of a carousel for manufacturing pancakes or crêpes, including a device for spreading batter on a hotplate and which is mounted on an articulated arm according to the invention.

In a variant embodiment presented in FIG. 3, the device 100 for spreading a runny batter on a hotplate is mounted in a carousel Mn including a plurality of hotplates Pc installed on a rotary table Tt. This rotary table Tt is mounted on a vertical shaft held in a frame Bt. The shaft is connected to a rotation means such as a geared motor designed to rotate the table Tt at a continuous speed. The arrow E indicates the rotation movement of the table Tt. The speed of the geared motor is adjustable. In this FIG. 3, six hotplates are disposed at the periphery of the rotary table Tt. The heating elements thereof are connected to an electrical supply sized so as to supply them with current in order to operate them.

The carousel Mn also comprises a pivoting arm Bpv, one end of which is mounted on a pivot centred on the axis of the vertical shaft of the rotary table Tt.

The pivoting arm Bpv is constructed in two parts, a part A, one end of which is mounted on the pivot, and a part B that carries at its distal end the device 100.

Figure 4:
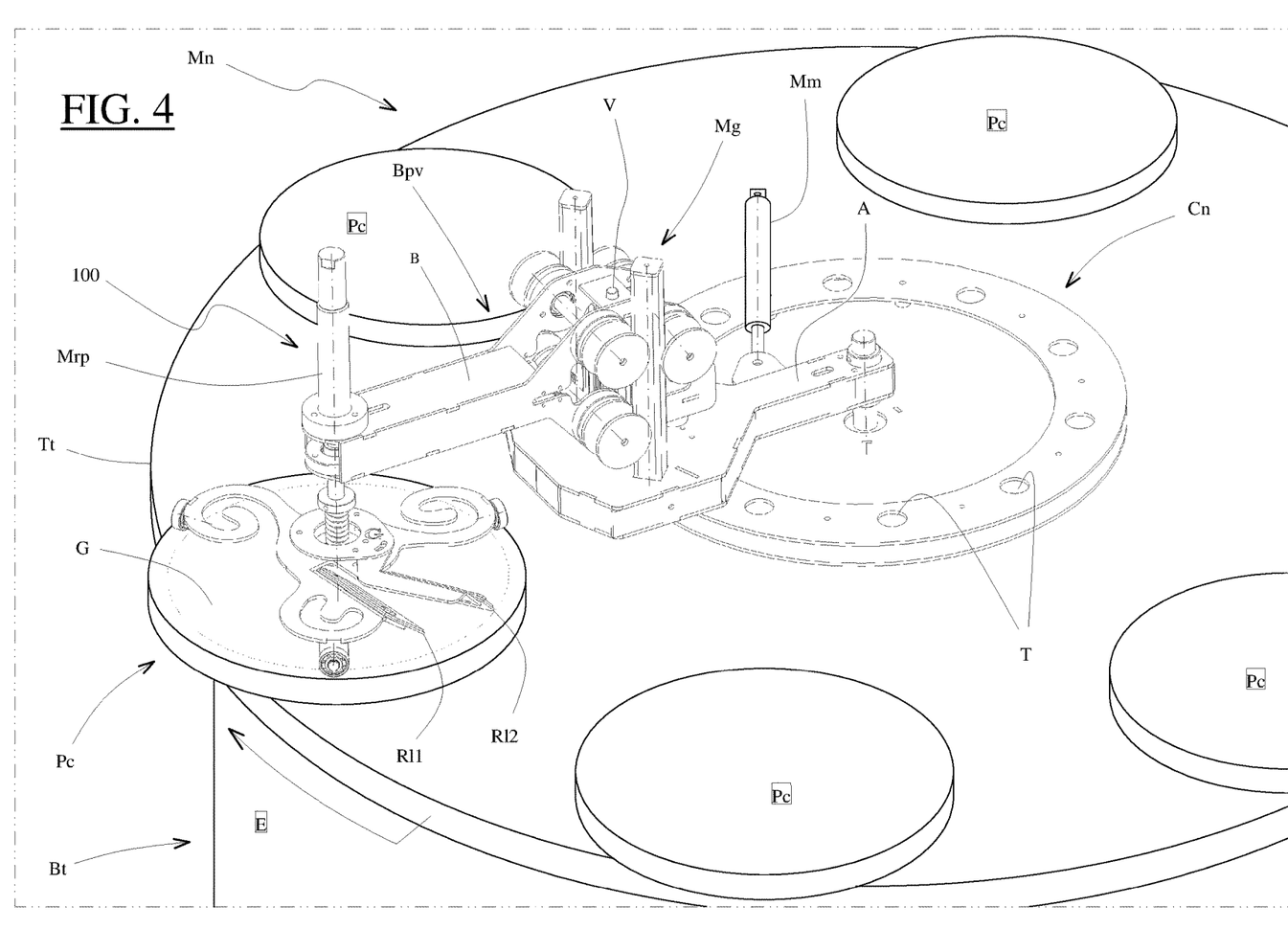
FIG. 4 shows an enlarged perspective view of a carousel for manufacturing pancakes or crêpes, including a device for spreading batter on a hotplate and which is mounted on a pivoting arm according to the invention of an arm.

In FIG. 4, the two parts A and B of the pivoting arm Bpv are joined by means of a linear guide means Mg with a vertical axis in the operating position of the carousel Mn enabling the part B to be raised or lowered with respect to the part A. The guide means consists, in this FIG. 4, of a pair of guide shafts fixed to the part A and three pairs of running rollers fixed to the part B and able to run while being guided on the two guide shafts.

A linear manoeuvring means V, such as a single-acting pneumatic cylinder, is interposed between the part A and the part B in order to raise or lower the device 100.

In this FIG. 4, the presence is noted of a ring Cn fixed to the table Tt, being centred on the axis of its vertical shaft that serves to angularly locate the pivoting arm Bpv so that the device 100 can descend and work in turn on each of the hotplates Pc in order to spread a portion of batter and work the batter, as described above. The ring Cn is pierced at its periphery with a plurality of vertical-axis holes T that are angularly distributed around the ring and facing the hotplates Pc. There are as many holes as there are hotplates Pc.

The part B is provided with a tapered pin that, during the descent movement of this part B, fits and is positioned in a corresponding hole T, when the pivoting arm Bpv is correctly oriented. Thus, when the arm is positioned in this way on the table Tt, the device 100 is positioned above a corresponding hotplate Pc, as is clear in this FIG. 4. The working of the batter and the cooking of the pancake G are carried out during the rotation of the rotating table Tt. When the part B is raised, by means of the cylinder V, the pivoting arm Bpv is dislocated from the rotary table and can be moved angularly so as once again to be located on the ring in order to be oriented on the following hotplate. The angular return orientation movement of the arm Bpv is implemented by means of a manoeuvring means Mm, such as a single-acting pneumatic cylinder connected to the frame Bt. The pneumatic cylinder is supplied by a type 3/2 pneumatic manifold that exhausts the chamber of the cylinder so that its rod can accompany the pivoting arm Bpv when it is driven by the rotary table Tt.

The carousel Mn is also equipped with a unit for depositing a portion of batter on each of the hotplates that follow each other, but which is not depicted. This unit for depositing a portion of batter is composed of a hopper intended to contain the batter for manufacturing pancakes, and an apportioning device responsible for pouring the batter forming a portion of batter on said hotplate.

The carousel Mn is also provided with a pancake extractor, comprising a movable blade designed to detach each pancake cooked on each hotplate in order to transfer it to a packaging station.

The carousel is also equipped with an apparatus for cleaning and greasing each hotplate. The apparatus comprises a fabric impregnated with a fatty substance such as a vegetable cooking oil.

The means for manoeuvring the carousel Mn and the motor Mrp for rotating the device 100 are connected to a control unit including a microprocessor and a memory accessible to the microprocessor in which parameterisable software is stored for regulating the functioning of these various actuators.

The functioning of the carousel Mn for manufacturing pancakes is as follows. The hopper is filled with batter, the hotplates Pc are energised and the rotary table Tt is set in motion. When the plates are hot, the apportioner pours a portion of batter onto a first hotplate Pc. The cylinder V raises the part B of the pivoting arm Bpv and the latter is brought, by means of the cylinder Mm, above this hotplate.

At this stage, the cylinder V is purged and the pneumatic rotary motor Mrp is started up in order to rotate the two rakes R11 and R12, which work on the hotplate in order to spread the portion of batter and spread and rake the batter. During the positioning of the tapered pin in a corresponding hole T, the axis of the shaft Ar of the device 100 oscillates a little, making it possible to eliminate the hole at the centre of the pancake being manufactured. The pancake is manufactured during the rotation of the rotary table Tt.

At the end of the manufacture of the pancake, the cylinder V raises the part B of the pivoting arm Bpv and the cylinder Mm returns it in the direction of the following hotplate on which a portion of batter has been deposited.

During this time, the cooked pancake has been detached from the first hotplate, and then the hotplate is cleaned and greased for future use.

A time delay with an adjustable triggering duration is used for counting down the descent time of the cylinder V used for the descent of the device 100 in order to adjust the duration of work of the two rakes R11 and R12. The speed of rotation of the pneumatic rotary motor Mrp is also adjustable in order to adapt it to a type of pancake recipe.

The carousel Mn for manufacturing pancakes functions autonomously. The quality of manufacture of the pancakes is similar to those manufactured by hand by a skilled person.

The invention claimed is:

1. A device for spreading runny batter on a hotplate in order to manufacture pancakes or crêpes, comprising:
    a rotary shaft intended to be disposed almost perpendicular with respect to the cooking face of the hotplate,
    a first plate fixed to said rotary shaft, said first plate carrying a spreading and raking means,
    at least one abutment designed to bear and run or slide on the cooking face of the hotplate, wherein the spreading and raking means comprises at least one rake, a working free edge of which is rectilinear, making it possible firstly to spread a portion of batter previously deposited on the heating face of said hotplate and secondly to rake the thickness of batter as long as it remains liquid so as to redeposit a layer of material upstream in order to layer the batter and fill in holes, reproducing the action of a person skilled in the art of making pancakes or crêpes; and
    a first rake carried by said first plate and a second rake carried on a second plate, the free edge of the first rake being disposed so as to be practically secant to an axis of the rotary shaft, an inner edge of the first rake extending at least as far as the axis of said shaft, and in that the second plate is connected to the first plate by means of height-adjustment means, considering the device in the position of use thereof.

2. The device according to claim 1, wherein the adjustment means comprise bolts connecting the two plates and springs interposed between the two plates so as to procure a floating assembly of the second plate.

3. The device according to claim 1, wherein said or each rake is disposed so as to be inclined with respect to a plane tangent perpendicularly to said abutment and the angle of which is between 20 degrees and 30 degrees.

4. The device according to claim 1, wherein the second rake is mounted on a support assembled on the second plate, by means of a fixing means with its axis parallel to that of the rotary shaft, allowing an angular adjustment of said support with respect to this second plate.

5. The device according to claim 1, wherein said or each rake consists of a sheet of silicone or consists of a plurality of sheets of silicone superimposed.

6. The device according to claim 2, wherein the weight is fixed to the support of the second rake so that its free edge can exert a predefined working pressure on the batter being cooked during the manufacture of the pancake or crêpe.

7. The device according to claim 1, wherein the second rake is provided on its outer lateral edge with a retainer intended to delimit the maximum spreading perimeter of the batter, in this way defining the diameter of the pancake.

8. The device according to claim 1, further comprising three abutments respectively consisting of three ball bearings, and the axes of which are secant to the axis of the shaft.

9. The device according to claim 1, wherein the shaft is connected to a rotation means.

10. An assembly comprising a carousel provided with:
a rotary table mounted for rotation about a vertical axis, considering the operating position of said carousel, the table carrying a plurality of hotplates distributed at the periphery thereof,
a pivoting arm the rotation axis of which is coaxial with that of the rotary table, the pivoting arm comprising a first part carrying the articulation shaft of said arm, and a second part able to move vertically with respect to the first part by means of a linear guide means and counter to a linear maneuvering means, wherein the distal end of the second part of the pivoting arm carries a device according to claim 1.

11. The assembly according to claim 10, wherein the rotary table is provided with a ring centered on its rotation axis, said ring being pierced at its periphery with a plurality of holes with a vertical axis, which are distributed angularly, the second part being provided with a tapered pin which, during the descent movement of this second part, fits and positions itself in a corresponding hole, and in that the pivoting arm is connected to a maneuvering means designed to pivot it angularly about its rotation axis.

12. A device for spreading runny batter on a hotplate in order to manufacture pancakes or crêpes, comprising:
a rotary shaft intended to be disposed almost perpendicular with respect to the cooking face of the hotplate,
a first plate fixed to said rotary shaft, said first plate carrying a spreading and raking means, and
at least one abutment designed to bear and run or slide on the cooking face of the hotplate,
wherein the spreading and raking means comprises at least one rake, a working free edge of which is rectilinear, making it possible firstly to spread a portion of batter previously deposited on the heating face of said hotplate and secondly to rake the thickness of batter as long as it remains liquid so as to redeposit a layer of material upstream in order to layer the batter and fill in holes, reproducing the action of a person skilled in the art of making pancakes or crêpes, and
wherein said or each rake is disposed so as to be inclined with respect to a plane tangent perpendicularly to said abutment and the angle of which is between 20 degrees and 30 degrees.

* * * * *